(12) United States Patent
Neitzke et al.

(10) Patent No.: US 8,616,494 B2
(45) Date of Patent: Dec. 31, 2013

(54) SWITCHABLE VORTEX GENERATOR AND ARRAY FORMED THEREWITH, AND USES OF THE SAME

(75) Inventors: Klaus-Peter Neitzke, Bremen (DE); Karin Bauer, Oberhaching (DE); Christian Bolzmacher, Münsing (DE); Winfried Kupke, Ottobrunn (DE)

(73) Assignee: Airbus Operations GmbH, Hamburg (DE)

( * ) Notice: Subject to any disclaimer, the term of this patent is extended or adjusted under 35 U.S.C. 154(b) by 950 days.

(21) Appl. No.: 12/436,616

(22) Filed: May 6, 2009

(65) Prior Publication Data

US 2010/0018322 A1 Jan. 28, 2010

(30) Foreign Application Priority Data

May 7, 2008 (DE) .......................... 10 2008 022 504

(51) Int. Cl.
*B64C 3/38* (2006.01)
*B64C 5/10* (2006.01)
*B64C 9/00* (2006.01)
*B64C 19/00* (2006.01)
*B64C 21/00* (2006.01)

(52) U.S. Cl.
USPC ...... 244/99.12; 244/201; 244/204; 244/204.1

(58) Field of Classification Search
USPC ................. 244/99.12, 200.1, 201, 204, 204.1
See application file for complete search history.

(56) References Cited

U.S. PATENT DOCUMENTS

| 5,209,438 | A | * | 5/1993 | Wygnanski | 244/203 |
| 5,734,990 | A | | 4/1998 | Waring | |
| 6,220,550 | B1 | * | 4/2001 | McKillip, Jr. | 244/215 |
| 6,267,331 | B1 | * | 7/2001 | Wygnanski et al. | 244/204 |
| 6,345,792 | B2 | * | 2/2002 | Bilanin et al. | 244/215 |
| 6,512,435 | B2 | * | 1/2003 | van Namen | 335/234 |
| 6,685,143 | B1 | * | 2/2004 | Prince et al. | 244/203 |
| 6,837,465 | B2 | * | 1/2005 | Lisy et al. | 244/204.1 |
| 7,070,144 | B1 | * | 7/2006 | DiCocco et al. | 244/3.21 |
| 7,226,015 | B1 | * | 6/2007 | Prince et al. | 244/3.21 |
| 7,334,760 | B1 | * | 2/2008 | Lisy et al. | 244/203 |
| 7,410,133 | B2 | * | 8/2008 | Lee et al. | 244/215 |
| 7,766,281 | B2 | * | 8/2010 | Lorkowski et al. | 244/215 |
| 7,977,615 | B1 | * | 7/2011 | Prince et al. | 244/3.24 |
| 8,006,941 | B2 | * | 8/2011 | Lorkowski et al. | 244/215 |
| 2001/0010348 | A1 | * | 8/2001 | Bilanin et al. | 244/215 |
| 2001/0020666 | A1 | * | 9/2001 | Wygnanski et al. | 244/204 |
| 2004/0129838 | A1 | * | 7/2004 | Lisy et al. | 244/199 |
| 2010/0282900 | A1 | * | 11/2010 | Lorkowski et al. | 244/1 N |

FOREIGN PATENT DOCUMENTS

| DE | 102 08 258 B4 | 5/2004 |
| DE | 60 2004 004 T2 | 6/2007 |
| DE | 60 2004 001 T2 | 8/2007 |
| DE | 10 2006 018 133 A1 | 10/2007 |

(Continued)

*Primary Examiner* — Philip J Bonzell
(74) *Attorney, Agent, or Firm* — Global IP Counselors, LLP

(57) ABSTRACT

The invention relates to a vortex generator (10), in particular for a model (12) in a fluid-dynamic channel. In order to save time during the development of vehicles, in particular aircraft, in particular to save wind tunnel time, it is suggested to configure the vortex generator (10) switchable. Further, the invention relates to various uses of such a switchable vortex generator (10), in particular on models in fluid-dynamic channels and in fluid-dynamic channel tests.

24 Claims, 7 Drawing Sheets

(56) References Cited

FOREIGN PATENT DOCUMENTS

| WO | WO-03/106260 A1 | 12/2003 |
| WO | WO-2005/006365 A1 | 1/2005 |
| WO | WO-2006/040532 A1 | 4/2006 |
| WO | WO 2006056160 A1 * | 6/2006 | ................ B64C 3/50 |
| WO | WO-2007/118628 A1 | 10/2007 |

* cited by examiner

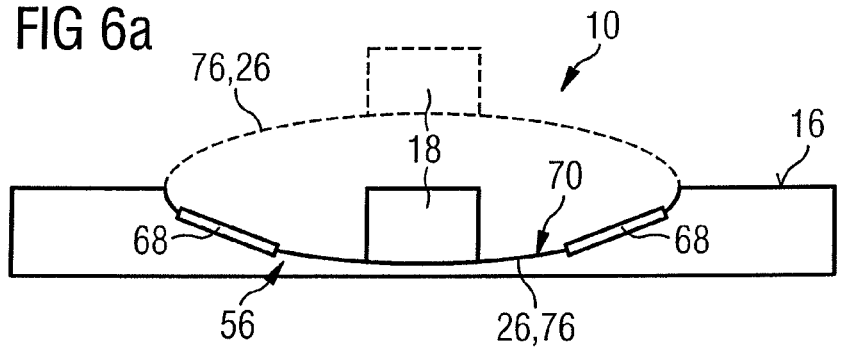
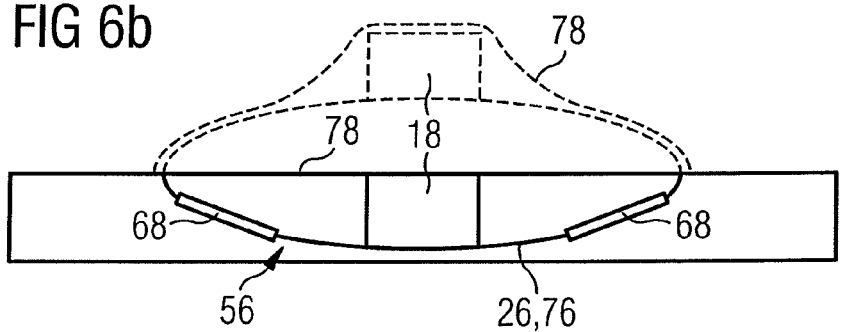
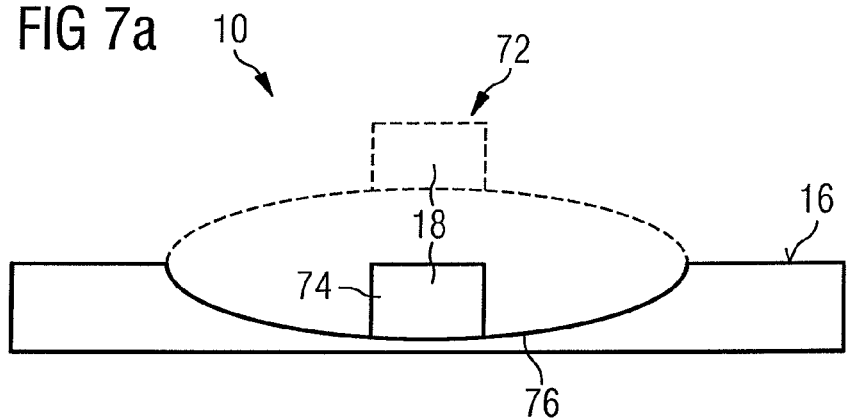
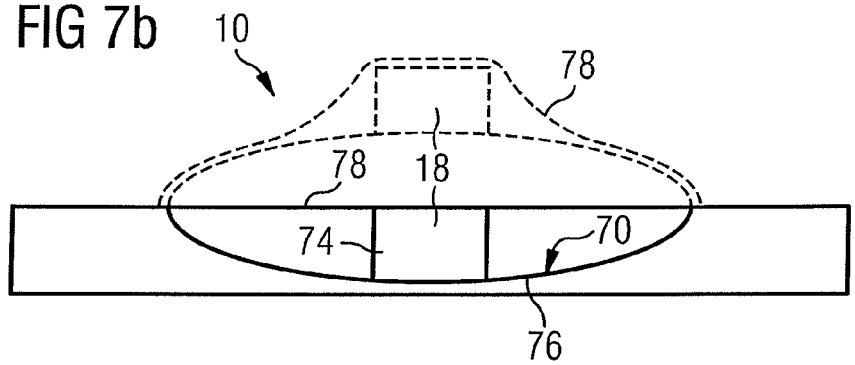

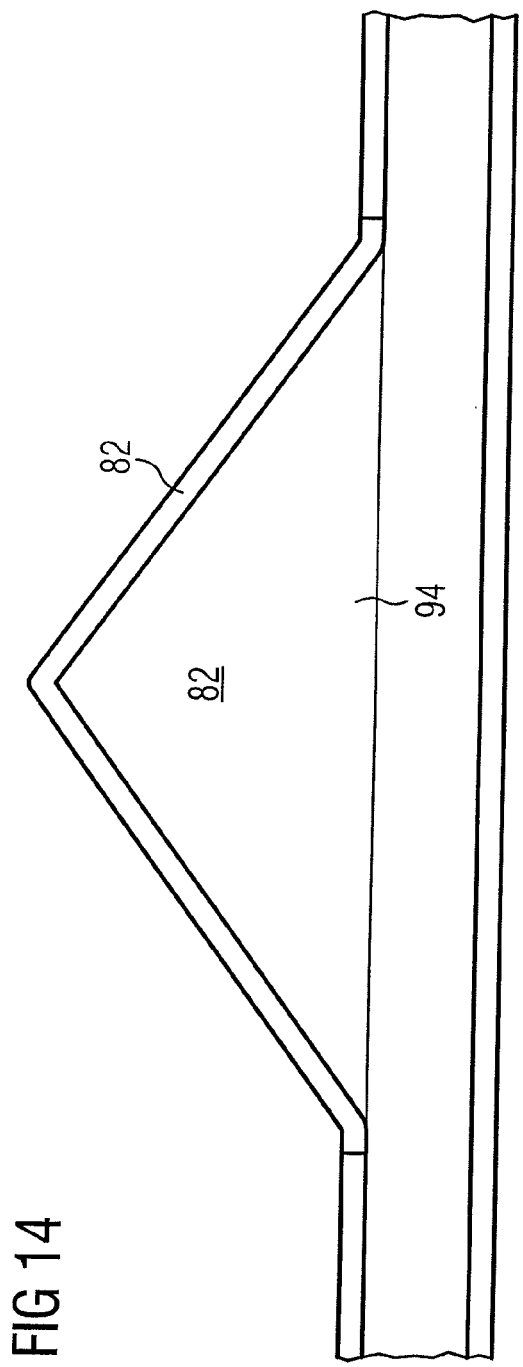
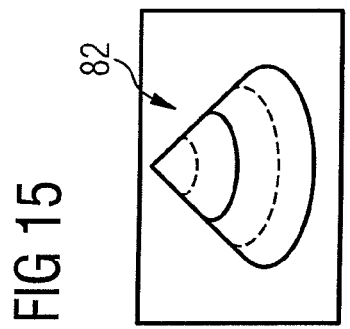

SWITCHABLE VORTEX GENERATOR AND ARRAY FORMED THEREWITH, AND USES OF THE SAME

CROSS-REFERENCE TO RELATED APPLICATIONS

This application claims priority to German Patent Application No. 10 2008 022 504.5 filed on May 7, 2009. The entire disclosure of German Patent Application No. 10 2008 022 504.5 is hereby incorporated herein by reference.

BACKGROUND OF THE INVENTION

1. Field of the Invention

The invention relates to a vortex generator and various uses of the same.

2. Background Information

A vortex generator (also referred to as a turbulator or turbulence generator), in the field of aerodynamics, refers to a small artificially applied surface discontinuity, which is supposed to generate a vortex in a fluid medium flowing over a surface. For example, a vortex generator is used to prevent stalling from happening in a controlled manner. Vortex generators can be found, for example, on the top surfaces of the wings of airplanes. An example of an array of vortex generators on a wing profile is explained in more detail in WO 00/15961.

Vortex generators are also used, however, in fluid-dynamic channel measuring methods, such as in wind tunnel tests for measuring the acoustics of various vehicle configurations, such as various aircraft configurations. In wind tunnel measurements, vortex generators prevent the generation of individual tones, which would not be generated on the originals, on corresponding vehicle models such as airplane models.

If the aerodynamics, rather than the acoustics of the configuration to be tested are to be measured in the wind tunnel, vortex generators are a disturbance. Therefore aerodynamic measurements are carried out without vortex generators.

Currently vortex generators are manually applied and also removed. In combined aerodynamic and acoustic measurements, the vortex generators must be repeatedly applied and removed.

In conventional wind tunnel tests adhesive vortex generators—also referred to as "tripping tape" or "turbulence tape"—of various structures are common. A main drawback is the re-rigging time needed to repeatedly apply and remove the vortex generators.

Various efforts have been made to reduce preparation time for preparing a wind tunnel model for wind tunnel tests. In DE 10 2006 018 133 A1 and WO 2007/11 8628 A1, an apparatus and a method for manufacturing a test adhesive tape roll for making air flows visible is suggested, by means of which test adhesive tape with pieces of string attached to it are provided for quicker application on wind tunnel models. However, again, the test adhesive tape with the pieces of string attached to it must be applied to the model. There is no mention of how vortex generators are handled on the model itself.

In the development of aircraft, such as airplanes, in particular, in typical wind tunnel tests, many different aircraft configurations, such as airplane configurations are tested. This can be as many as ten configurations a day. For each configuration, an aerodynamic measurement and an acoustic measurement is carried out. As a consequence the vortex generators must be frequently applied and removed. A lot of time is thus lost which could otherwise be used for measuring.

SUMMARY OF THE INVENTION

It is an object of the present invention to provide a vortex generator with which the development of new vehicle and airplane configurations can be made substantially quicker and simpler.

It is a further object to provide an optimized equipment and method for easy and quick aerodynamic and/or acoustic measurements on all kinds of vehicles.

It is a further object to provide an optimized vortex generator that can be easily adapted to special needs without wasting energy.

For addressing such objects, the invention provides a switchable vortex generator, in particular, but not exclusively, for a model in a fluid-dynamic channel.

According to a first aspect of the invention, there is provided a switchable vortex generator for arrangement on a flow-dynamic surface comprising a vortex generating element reciprocatingly switchable between at least two positions, wherein the vortex generating element is adapted for generating vortices in a flow flowing in the area of said flow-dynamic surface, and a supporting means supporting said vortex generating element, wherein the supporting means is moveable for selectively holding the vortex generating element at least in a first position and in a second position differing from said first position, wherein the supporting means is arranged to hold the vortex generating element in a position extended from the surface and in a position retracted into the surface, the supporting means including a biasing means for biasing the vortex generating element in the first position so that the vortex generating element remains in the first position without energy input.

According to a second aspect of the invention, there is provided vortex generator for generating vortices, being switchable between at least two stable switching states, wherein the vortex generator maintains each stable switching state without energy input, the vortex generator comprising a bistable biasing means enabling a switching between the stable switching states just by an energy impulse.

Preferably, the vortex generator according to the invention can be switched on and off from outside without interrupting the operation of a wind tunnel. Downtimes are thus avoided.

In one embodiment, the vortex generator can be switched by applying a strong permanent magnet, or also by exerting an external force, such as a mechanical force, without however having to remove the vortex generator carrier material from a model. An advantage of this variant is the absence of electric or fluid lines to the model, which would otherwise be used for switching the vortex generator.

Generally, switchable vortex generators allow aero-acoustic tests to be carried out more quickly in a wind tunnel or other fluid-dynamic channel. Furthermore, the position of each vortex generator is excellently reproducible, because it can remain in place.

The described adaptive or switchable vortex generators can also be used, of course, simply for influencing the flow, i.e. on finished vehicle and aircraft models in operation or in purely aerodynamic tests. For example, the switchable vortex generators could also be used to delay flow separation like well-known vortex generators. The use of the vortex generators can then of course also depend on the respective cruising or flying state. For example, the vortex generators can also be switched off if their contribution to drag becomes too great.

An advantageous use of the vortex generator relates to a vortex generating device with an array of a plurality of such switchable vortex generators. For example, a whole array with switchable vortex generators is provided on a surface of an object to be tested or on another body in a flowing fluid medium. Such an array of vortex generators, which can preferably be switched together, has several advantages and possible usages.

For simplifying and accelerating aerodynamic and aeroacoustic tests, it is useful to have arrays of vortex generators, in which the vortex generators can be extended and retracted. This enables measurements in wind tunnel tests with and without vortex generators without additional re-rigging time.

In contrast, in typical aerodynamic measurements in wind tunnels, no vortex generators are used; these would often be a disturbance in measuring the aerodynamic behavior of the body to be tested. Vortex generators are necessary, however, for a series of acoustic measurements, since they prevent the generation of individual tones on models during measurement in the wind tunnel, which would not occur on the originals. This is why currently the vortex generators are manually applied and removed again in such tests. In combined aerodynamic and acoustic measurement, the vortex generators are repeatedly applied and removed.

Vortex generators and vortex generating devices formed by them, can also be used on original vehicles, in particular original airplanes, to influence the flow in a desired manner. A vortex generating apparatus on an original airplane can serve, for example, to avoid flow separation during starting and landing. If original airplanes are equipped with switchable vortex generators, they can be retracted during cruising flight, so as not to generate additional drag. A not inconsiderable amount of fuel can thus be economized.

The array of switchable vortex generators can have a wide variety of structures. If only a switch from laminar flow to turbulent flow is needed, the individual vortex generators can be stochastically distributed and also vary in size and shape. This is how unordered turbulences are generated with the classical "transition tape".

In another embodiment, the vortex generators are applied and/or manufactured in an ordered arrangement. For example, the vortex generators can be arranged periodically spaced with respect to each other. Ordered vortex arrays thus occur in the near vicinity of such ordered vortex generator structures. Certain frequency ranges of the spectrum can be highlighted or suppressed, for example, by a suitable arrangement. Desired vortex arrays can be influenced by special shapes and/or by the size ratios of the vortex generating elements of the individual vortex generators.

In a preferred embodiment, the switchable vortex generators according to the present invention include a switchable vortex generating element. It can preferably be switched in at least two states:

1) in an extended state, the vortex generators are active and generate a turbulent boundary layer, and
2) in a retracted state, the flow remains laminar.

Preferably, the vortex generating element is arranged on a supporting means, which can move the vortex generating element into a first position and into a second position, and which is switchable between these two positions.

The vortex generator preferably has at least one stable switching state. A stable state is characterized in that it is maintained without energy input. For example, the supporting means is formed in such a way that the vortex generating element remains in the first position if no energy is input. For this purpose, in particular, a biasing means can be provided for holding the vortex generating element in the first position.

The biasing means, in a concrete implementation, can operate magnetically, electrostatically, electrodynamically or mechanically. For example, a leaf spring element or the like, or a magnet could be present.

According to an embodiment with a monostable arrangement, the vortex generator is in a retracted state without energy input and is extended in an energized state. In an alternative monostable arrangement, a stable extended state and an energized retracted state are provided.

The vortex generator can have at least one, or two, stable switching states. In a bistable structure, both switching states are maintained without energy input. For example, the vortex generating element is held both in the extended and retracted states without energy input. An energy impulse is only needed for switching states. This can be achieved in a concrete implementation by a corresponding bistable biasing means. For example, holding magnets are associated with each state. In another implementation, a bistable, in particular a mechanical spring element is provided. Mixed forms are also conceivable.

Preferably a switching mechanism is provided, with which the vortex generator can be switched between its at least two switching states, preferably under signal control. In an array of switchable vortex generators, they can preferably be jointly switched.

A variation with a modified switching mechanism is also possible. In a possible embodiment of the invention, there are thus ferromagnetic and permanent-magnetic areas, which contact each other when deflected and adhere to each other with great force. This force is maintained until an external separating force occurs. For example, this external force can be created by externally passing a permanent magnet over the array of vortex generators.

Generally, the switching mechanism for realizing state switching can use various actuator principles. Electromagnetic switches, piezo-electric switches, electrostatic switches, pneumatic switches, hydraulic switches, thermomechanical switches and mixed forms can be used. As has just been explained, mobile permanent magnets can also be used as an actuator principle.

Irrespective of the actuator principle, basically a general structure of the vortex generator is preferred. Preferably, a covering membrane is provided creating a surface which is as smooth as possible. In an embodiment, this covering membrane can be elastically formed, and can be deformed to the outside or correspondingly moved by actuators situated underneath. In another possible embodiment, through holes of suitable geometry are incorporated in the covering membrane to allow retraction and extension of the vortex generators.

In a preferred embodiment, below such a covering membrane, a generator membrane or actuator membrane can be provided switchable between the at least two positions and forming a main component of the supporting means. The vortex generating element can be installed on the actuator membrane. A spacer can be provided between the actuator membrane and the covering membrane to create a space between the covering membrane and the actuator membrane, within which the actuator membrane can move. A further spacer can also be provided below the actuator membrane to create a lower space for additional mobility. A carrier membrane can serve, for example, as a lower closure. A flexible structure formed by a plurality of membranes can be adapted to various bodies and surfaces to be tested. This is why the use of membranes is preferred. A selection of various geometric structures can be used as the actual vortex generators or vortex generating elements. Circular, ellipsoid, rectangular, quadratic, triangular and polygonal structures are possible. Vortex generating elements can also have, for example, the shape of chevrons, i.e. single or double chevrons. The array of switchable vortex generators of the vortex generating apparatus can consist of vortex generating elements of a single geometry or can be mixed. The arrangement in the array can be periodic or statistically distributed.

A preferred manner of manufacturing an array of vortex generators comprises making vortex generators of photolithographically structured photoresist. Alternatively, the generators are formed as metallic structures by forming processes.

In wind tunnel tests, bodies in flowing fluid media can be used which are provided with such switchable vortex generators. Switching the vortex generators on and off can be done while the wind tunnel is operating. This is how both aerodynamic measurements and acoustic measurements can be carried out under identical flow conditions without having to switch off or slow down the wind tunnel. These measurements can be repeated many times to obtain more precise measuring results.

A body in a flowing fluid medium is preferably a model of an airplane for wind tunnel tests, which is provided with a plurality of switchable vortex generators.

BRIEF DESCRIPTION OF THE DRAWINGS

Exemplary embodiments of the invention will be described in the following with reference to the accompanying drawings in more detail, wherein:

FIG. 6 is a schematic sectional view of a fifth embodiment of the vortex generator, wherein FIG. 6a shows this embodiment without and FIG. 6b with an additional coating, and wherein a possible stable second state is shown with a broken line;

FIG. 7 is a view comparable to the one of FIG. 6 for a sixth embodiment of a switchable vortex generator in a passive embodiment without (FIG. 7a) and with a coating (FIG. 7b);

FIGS. 12-15 are different views of different modifications of the eighth embodiment of the switchable vortex generator.

DETAILED DESCRIPTION OF THE PREFERRED EMBODIMENTS

Figure 1:
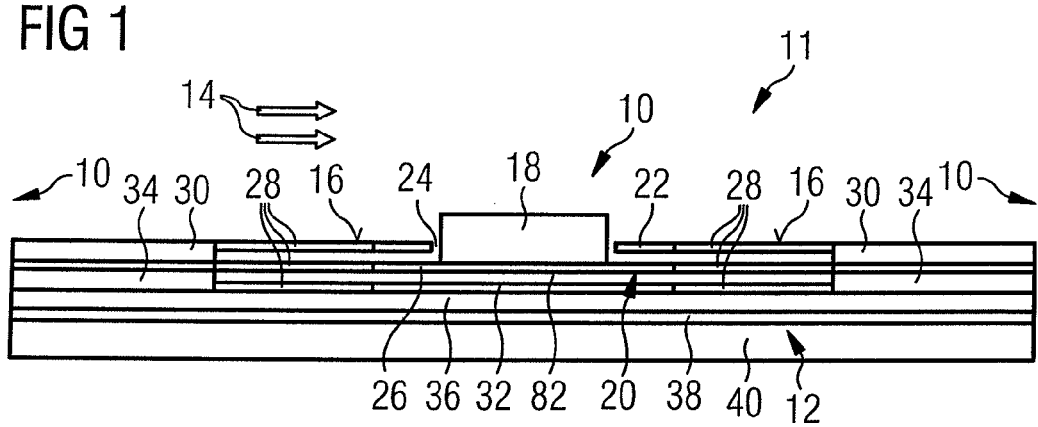
FIG. 1 is an enlarged sectional view of a surface area of a body in a flowing fluid medium taking an airplane model as an example with a switchable vortex generator in a general structure.

First, a general structure of a switchable vortex generator generally indicated by 10 will be described with reference to FIG. 1. FIG. 1 shows the area near the surface of a body in a flowing fluid medium, which in the present example is an airplane model 12 to be tested in a wind tunnel (not shown). Airplane model 12, on its surface 16, has an array of vortex generators 10, of which only one is shown in detail, against which a wind tunnel flow 14 flows. Neighboring identically structured vortex generators 10 are indicated by reference numerals 10 left and right of the structure shown. The array forms a vortex generating apparatus 11 having a plurality of commonly switchable vortex generators 10.

Vortex generator 10 has a vortex generating element 18, which is movable between a first position—extended state—and a second position—retracted state by means of a supporting means 20.

Vortex generator 10 has a covering membrane 22 for providing a surface 16 which is as smooth as possible. At least one through hole 24 of suitable geometry is incorporated in this covering membrane 22 per vortex generator 10 to enable retraction and extension of a vortex generating element 18. The supporting means 20 has a moveable actuator membrane 26 for supporting the vortex generating element 18 which fits through hole 24 of covering membrane 22. By deflecting actuator membrane 26, vortex generating element 18 is extendable through covering membrane 22, or it can be retracted into it. Actuators 28 are provided for moving actuator membrane 26.

A first spacer means 30 is provided between actuator membrane 26 and covering membrane 22 for providing a space between covering membrane 22 and actuator membrane 26. The lower closure of the vortex generator structure with respect to the model body is a carrying membrane 32. A second spacer means 34 is provided between carrying membrane 32 and actuator membrane 26 for providing a lower movement space—space 82—for actuator membrane 26.

In the exemplary structure shown, a carrier layer 36 is provided which is adhesively glued on the base body 40 of airplane model 12 by means of an adhesive 38.

Figure 2:
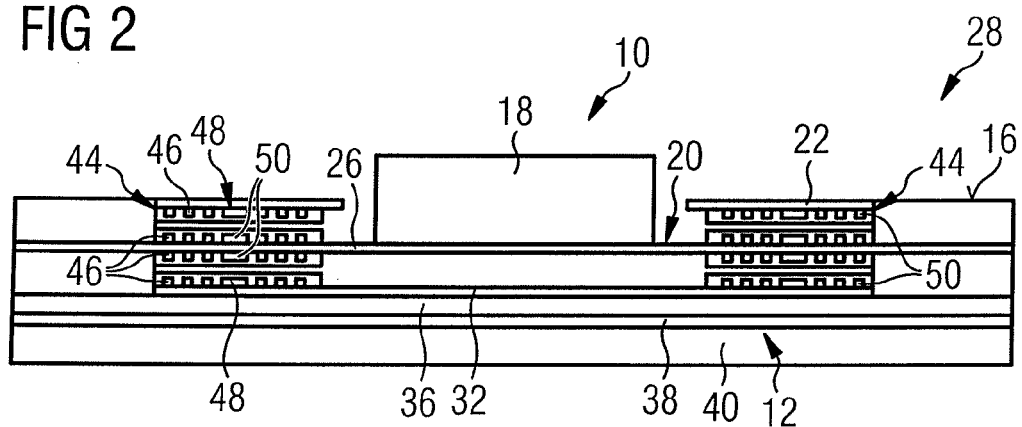
FIG. 2 is an enlarged sectional view of a first embodiment of the vortex generator.
Figure 3:
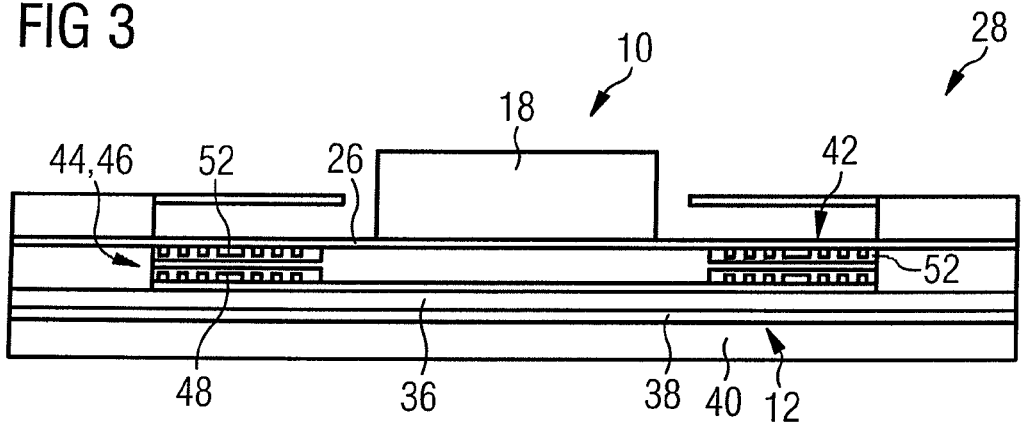
FIG. 3 is a corresponding view of a second embodiment of a vortex generator.
Figure 4:
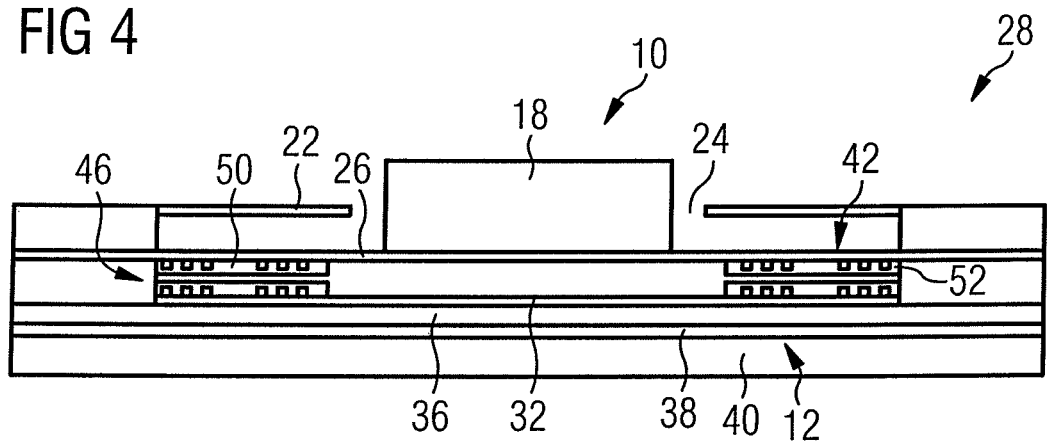
FIG. 4 is a corresponding view of a third embodiment of a vortex generator.

Three embodiments of the vortex generator 10 are shown in FIGS. 2, 3 and 4, in which electromagnetic drives 42 are provided as actuators 28. Coil systems 44 can be realized on covering membrane 22, actuator membrane 26 and/or carrying membrane 32 by means of microstructures. In the exemplary embodiments according to FIGS. 2 to 4, the coil systems 44 comprise planar coils 46. In the first exemplary embodiment according to FIG. 2 and in the second exemplary embodiment according to FIG. 3, they are provided with permanently magnetic cores 48 or ferromagnetic cores 50. The coil windings are received in a separating layer 52.

If a current flows through these coils 46, actuator membrane 26 is deflected. Depending on the flow direction of the current, the vortex generating elements 18 are retracted or extended.

In manufacture, permanent-magnetic and soft-magnetic structures—shown here as the permanent-magnetic cores 48 and the ferromagnetic cores 50—can additionally be created, which cause adhesion of actuator membrane 26 in the deflected state even without current flow. The additional separating layer 52 can lead to reduced adhesion between permanent-magnetic and ferromagnetic structures, as the case may be, which facilitates switching. An impulse-like current through the coils causes snapping from one state into the other.

The first embodiment according to FIG. 2 shows a structure possible for a bistable state. The most variable switching ability is provided by an electromagnetic drive with inserted magnetically active layers. The structure of the planar coils 46 and also the vortex generator 10 overall, and in particular of the vortex generating element 18 can advantageously be realized in MEMS technology.

However, not all of the elements of the electromagnetic drive shown in FIG. 2 need to be implemented. FIG. 3 shows a second embodiment of the vortex generator in a reduced form, wherein the coil systems 44 are only present on one side of actuator membrane 26. This structure is less cumbersome, but the switching forces achievable are smaller. Without current flow, actuator membrane 26 with vortex generating element 18 is in a resting position. A current through the planar coils 46 in a suitable direction leads to an attraction between the planar coils 46 until the permanent-magnetic core 48 of one coil and the ferromagnetic structure of the other coil come into contact and adhere. This adhesion stays intact after termination of the current flow. Renewed current flow with switched polarity can lead to repulsion between the coils so that the adhesion is overcome and the foil of actuator membrane 26 is deflected back. If the current is switched off, actuator membrane 26 with vortex generating element 18 returns to the rest position.

FIG. 4 shows an even simpler version. This results from the embodiment shown in FIG. 3 if the magnetic structures—cores 48, 50—are omitted. In the structure according to the third embodiment as shown in FIG. 4, vortex generating element 18 can be retracted into the coils by means of a current flow. Without current, the vortex generating element springs back to its rest position.

An embodiment not shown in any more detail of vortex generator 10 with an electrostatic drive results from a general structure as shown in FIG. 1 with the use of electrostatic actuators 28. Capacitor plates with a thin dielectric insulating layer can be realized by microstructures on the covering membrane 22, the actuator membrane 26 and the carrying membrane 32. If suitable potentials are applied to these plates, actuator membrane 26 is deflected. Depending on the potential of the plates, the vortex generating elements 18 are retracted or extended. While a bistable arrangement is theoretically possible, it can only be implemented with difficulty due to the losses of the dielectrica in practice.

An embodiment not shown in any more detail of vortex generator 10 with a piezo-electric drive results from the use of piezo-electric actuators as actuators 28 in the general structure of FIG. 1. For this purpose, piezo-electric layers and metallic electrodes are applied on actuator membrane 26. An applied voltage leads to warping out of actuator membrane 26 in a suitable direction.

Figure 5:
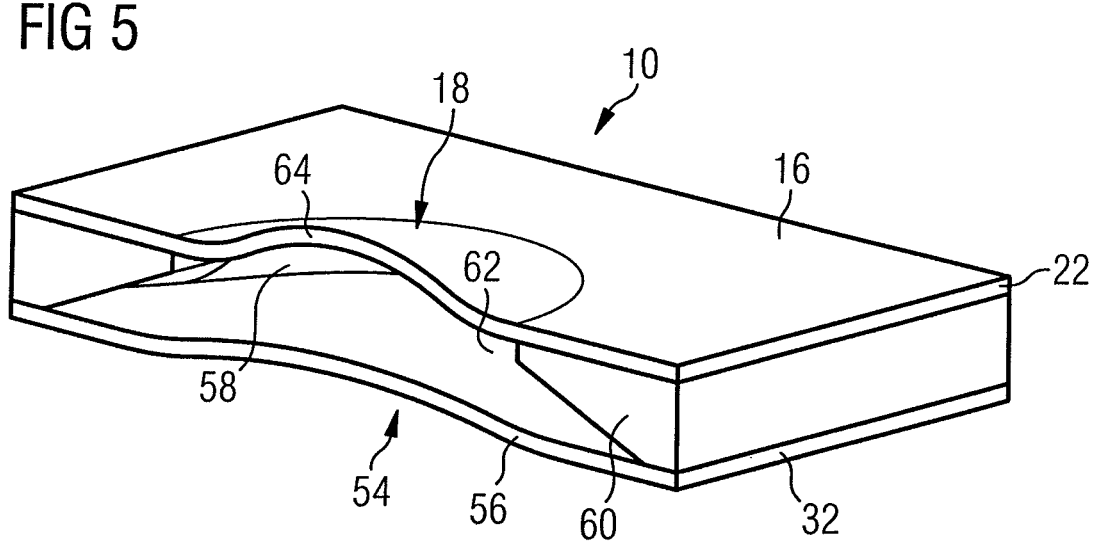
FIG. 5 is a perspective view of a fourth embodiment of a vortex generator.

FIG. 5 shows a concrete fourth embodiment of vortex generator 10 with a lift-reinforcing piezo-electric drive 54. This embodiment of the vortex generator 10 has a large piezo membrane 56 at the bottom of a cavity 58 filled with liquid. The boundary surfaces 60 of cavity 58 leave an opening 62 smaller with respect to the surface of piezo membrane 56 at the top, which is closed off by a flexible area of covering membrane 64. By directly transmitting the volume change initiated by means of piezo membrane 56, a lift-reinforcement on the flexible area 64 of the covering membrane is achievable by the fluid. Piezo membrane 56 can also have a bistable configuration, wherein two predefined states can be selected: vortex generator ON or OFF. Piezo material is used for switching.

Two modifications of an embodiment of the switchable vortex generator 10 with a piezo-electric drive are shown in FIG. 6, but without lift reinforcement. For creating this unreinforced piezo-electric drive 66, actuator membrane 26 is formed bistable—bistable membrane 76. Vortex generating element 18 is on actuator membrane 26. Switching between the two states is with the aid of piezo crystals 68. Actuator membrane 26 itself can be of any suitable material. The bistability—e.g. "clicker effect"—can be achieved by the geometric form of membrane 26, 76. Each extended position is shown as dashed lines in FIG. 6. Such membranes can easily be manufactured e.g. of metals or metal alloys. Local biasing or local curvature can also be created on plastic material or semiconductors by applying a coating 70 and subsequent structuring of the layers, wherein the structured coatings 70 create local mechanical stresses. A closed elastic layer 78 can be provided for forming the smooth surface 16. FIG. 6a shows an embodiment without and FIG. 6b an embodiment with this elastic layer 78.

On the basis of the structure according to FIGS. 6a and 6b, a passively switchable vortex generator can also be realized as shown in FIGS. 7a and 7b. Here, the piezo-electric drive 66 of the embodiment of FIG. 6 has been replaced by a passive magnetic drive 72. The passive magnetic drive 72 has a small permanent magnet 74, which is attached on the bistable membrane 76. In the example shown, permanent magnet 74 forms the vortex generating element 18. In other embodiments not shown in any more detail, permanent magnet 74 is part of vortex generating element 18 or is attached at a different place, such as on the back side.

In the magnetic drive as shown, for example, in FIGS. 7a and 7b, switching between the two states can be achieved by applying an external magnetic field. Switching is carried out, for example, by passing a further (strong) permanent magnet from the outside across the bistable membrane 76 with the small permanent magnets and/or the vortex generating element 18. Herein, attracting or repelling forces act on the permanent magnet 74, which can be used for switching the bistable membrane 76.

An advantage of this structure is its simple realization. A drawback is the necessity of manual switching, for example, during tests in the wind tunnel. With signal-controlled actuators 26, switching can also be carried out from outside. A drawback of this active switching ability is the necessity to have lines for signal and/or energy transmission extend to the individual vortex generator 10.

As shown in FIGS. 6b and 7b, the vortex generators of the embodiments can be configured with the bistable membrane 76 in such a way that the entire carrying structure in the retracted state of the bistable membrane 76 is covered with the elastic layer 78 and therefore has a smooth surface in this retracted state. In the extended state, shown as a broken line, this surface is then deformed by the drive, or by the drive and an optionally present vortex generating element 18.

Figure 8:
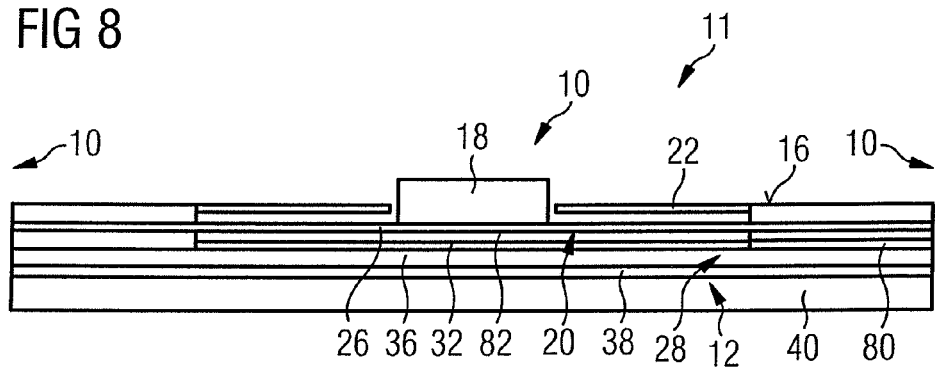
FIG. 8 is a view comparable to the one of FIGS. 2 and 3 for a seventh embodiment of the switchable vortex generator.

FIG. 8 shows a further embodiment of vortex generator 10 with a pneumatic or generally fluidic drive. This embodiment is distinguished from the general structure according to FIG. 1 in that a pressure line 80 extends to space 82 between carrying membrane 32 and actuator membrane 26. A positive pressure or negative pressure can thus be introduced into the cavity between carrying membrane 32 and actuator membrane 26 to cause the actuator membrane 26 to warp out or warp in. Herein, air or any other suitable fluid can be used as the pressurized medium.

Figure 9:
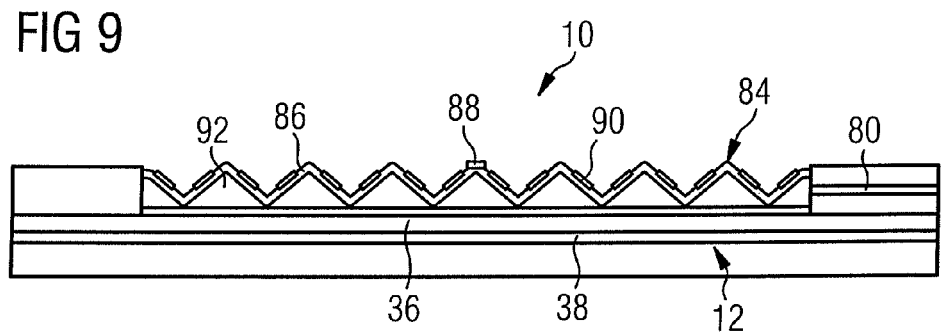
FIG. 9 is a schematic sectional view of an eighth embodiment of a switchable vortex generator in a first position.
Figure 10:
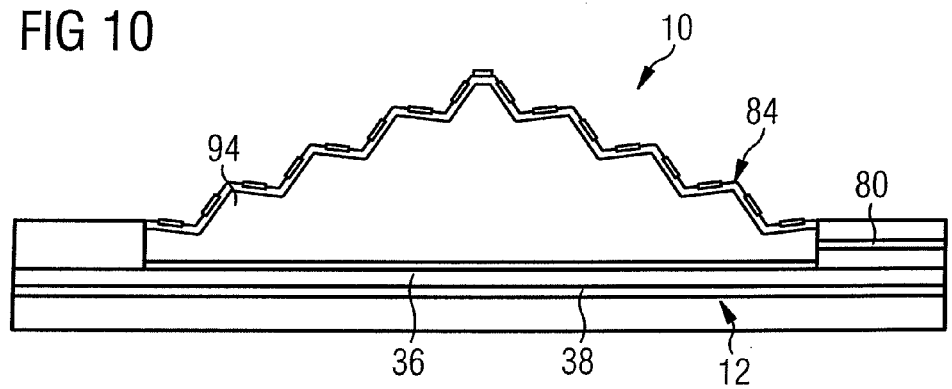
FIG. 10 is a view of the eighth embodiment in a second position.

FIG. 9 shows a further embodiment of vortex generator 10, which shows a further development of the vortex generator with a pneumatic drive. This vortex generator does not have an extra body as the vortex generating element 18. Instead of a simple actuator membrane 26, a folded membrane 84 is provided, The folded membrane 84 has been created, for example, by micro-embossing and can comprise an elastomeric foil 68, one or more platforms 88 and stiffening structures 29, which ensure desired deformation of the folded membrane 84 when a positive pressure is introduced into the space 82 between the folded membrane 84 and the carrying membrane 32. FIG. 10 shows a deflected state when a corresponding positive pressure is supplied. Accordingly, reference numeral 92 in FIG. 9 indicates a fluid with a negative pressure, and reference numeral 94 in FIG. 10 indicates a fluid with a positive pressure. FIGS. 12-15 show further schematic views of this basic embodiment with a pneumatic drive or a hydraulic drive.

Figure 11:
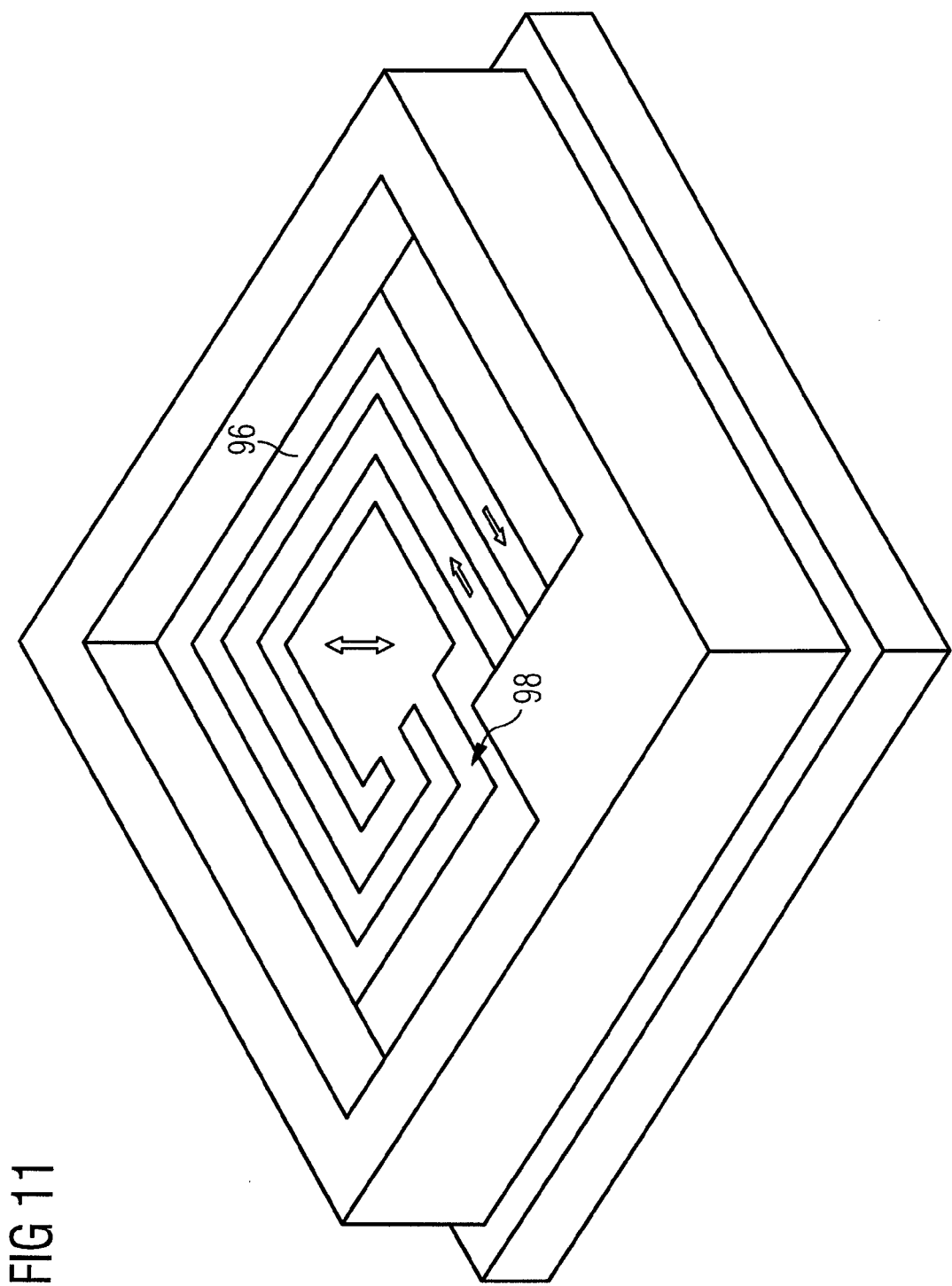
FIG. 11 is a perspective schematic view of a switching mechanism of a ninth embodiment of a switchable vortex generator.
Figure 12:
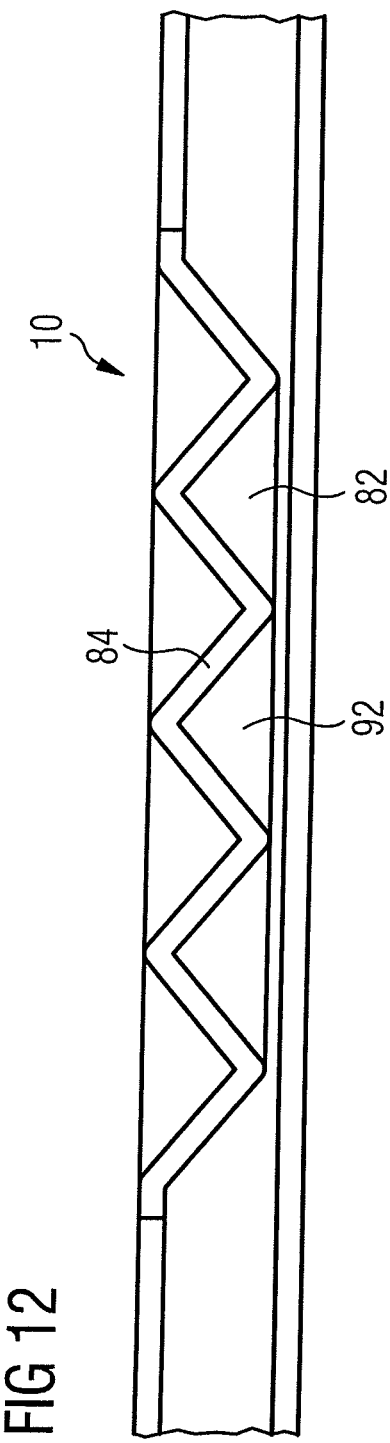
Figure 13:
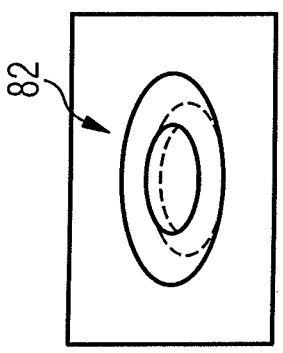

FIG. 11 shows a possible thermo-mechanic drive for the vortex generator 10. For this purpose, heating structures 96 are created on actuator membrane 26 and covered with form structures of bimetal or of a memory alloy. Selective heating of the structures causes warping out or warping in of the actuator membrane 26. FIG. 11 shows a possible micromechanical double spiral 98 of memory alloy which doubles as a heating filament—heating structure 96. Heating causes the double spiral 98 to extend.

LIST OF REFERENCE NUMERALS

10 vortex generator
11 vortex generating apparatus
12 aircraft model
14 flow
16 surface
18 vortex generating element
20 supporting means
22 covering membrane
24 through hole
26 actuator membrane
28 actuator
30 first spacer
32 carrying membrane
34 second spacer
36 carrying layer
38 adhesive
40 base body
42 electromagnetic drive
44 coil systems
46 planar coil
48 permanent magnetic core
50 ferromagnetic core
52 separating layer
54 lift-reinforced piezo-electric drive
56 piezo membrane
58 cavity
60 boundary surfaces
62 opening
64 flexible area of covering membrane
66 piezo-electric drive
68 piezo crystal
70 coating
72 passive magnetic drive
74 permanent magnet
76 bistable membrane
78 elastic layer
80 pressure line
82 space
84 folded membrane
86 elastomeric foil
88 platform
90 stiffening structure
92 fluid with negative pressure
94 fluid with positive pressure
96 heating structures
98 double spiral

The invention claimed is:

1. A switchable vortex generator for arrangement on a flow-dynamic surface comprising
a vortex generating element reciprocatingly switchable between at least first and second positions, the vortex generating element being configured to generate vortices in a flow flowing in the area of said flow-dynamic surface, and
a support member configured to support the vortex generating element, the support member being moveable to selectively hold the vortex generating element at least in the first position at which the vortex generating element is extended from the surface and in the second position, differing from the first position, at which the vortex generating element is retracted into the surface,
the support member including a bistable biasing member configured to bias the vortex generating element in the first position so that the vortex generating element remains in the first position without energy input.

2. The vortex generator according to claim 1, wherein the vortex generating element is formed as a profile element having a geometric profile structure chosen from a group containing circular, ellipsoid, rectangular, quadratic, triangular, polygonal, and chevron profile structures.

3. The vortex generator according to claim 1, wherein the biasing member includes at least one magnet.

4. The vortex generator according to claim 1, wherein the biasing member includes at least one electrostatic force generating member.

5. The vortex generator according to claim 1, wherein the biasing member includes at least one electrodynamic force generating member.

6. The vortex generator according to claim 1, wherein the biasing member includes at least one mechanical spring element.

7. The vortex generator according to claim 1, wherein the supporting member is configured in such a way that the vortex generating element also remains in the second position without energy input.

8. The vortex generator according to claim 1, wherein the bistable biasing member includes a first magnet for holding the vortex generating element in the first position and at least one second magnet for holding the vortex generating element in the second position.

9. The vortex generator according to claim 1, wherein the biasing member includes at least one bistable spring element.

10. The vortex generator according to claim 1, wherein the supporting member includes an actuator membrane moveable between the at least two positions and wherein the vortex generating element is mounted on the actuator membrane.

11. The vortex generator according to claim 1, wherein the supporting member is switchable between the two positions by the application of an external force.

12. The vortex generator according to claim 11, wherein at least one magnet element is associated to the supporting member for moving the supporting member from one of the first and the second positions to the other of the first and second positions by applying an external magnetic field.

13. The vortex generator according to claim 1, further comprising a switching mechanism for switching the vortex generator between an ON and an OFF state.

14. The vortex generator according to claim 13, characterized in that the switching mechanism is signal-controlled.

15. The vortex generator according to claim 13, wherein the switching mechanism includes at least one actuator from a group of actuators comprising electromagnetic actuators, piezo-electric actuators, electrostatic actuators, pneumatic actuators, hydraulic actuators, permanent-magnetic actuators and thermoelectric actuators.

16. The vortex generator according to claim 1, further comprising a covering membrane having a smooth surface, against which a flow to be influenced by the vortex generator can flow.

17. The vortex generator according to claim 16, wherein the covering membrane has a through hole through which the vortex generating element is extendable and retractable.

18. A vortex generating apparatus for arrangement on a flow-dynamic surface where a fluid medium flows, comprising an arrangement of a plurality of vortex generators, each vortex generator comprising:
   a vortex generating element reciprocatingly switchable between at least first and second positions, the vortex generating element being configured to generate vortices in a flow flowing in the area of said flow-dynamic surface, and
   a support member configured to support the vortex generating element, the support member being moveable to selectively hold the vortex generating element at least in the first position at which the vortex generating element is extended from the surface and in the second position, differing from the first position, at which the vortex generating element is retracted into the surface,
   the support member including a bistable biasing member configured to bias the vortex generating element in the first position so that the vortex generating element remains in the first position without energy input.

19. The vortex generating apparatus according to claim 18, wherein the vortex generators are arranged in a periodically distributed manner.

20. The vortex generating apparatus according to claim 18, wherein the vortex generators are arranged in a statistically distributed manner.

21. The vortex generating apparatus according claim 18, wherein at least two of the vortex generators have vortex generating elements with different profile geometry.

22. A body in a flowing fluid medium, having an arrangement of a plurality of vortex generators, each vortex generator comprising:
   a vortex generating element reciprocatingly switchable between at least first and second positions, the vortex generating element being configured to generate vortices in a flow flowing in the area of said flow-dynamic surface, and
   a support member configured to support the vortex generating element, the support member being moveable to selectively hold the vortex generating element at least in the first position at which the vortex generating element is extended from the surface and in the second position, differing from the first position, at which the vortex generating element is retracted into the surface,
   the support member including a bistable biasing member configured to bias the vortex generating element in the first position so that the vortex generating element remains in the first position without energy input.

23. The body according to claim 22, wherein the body is chosen from a group comprising a component of an aircraft, a component of a test model of an aircraft, and a wind channel test model.

24. A switchable vortex generator for arrangement on a flow-dynamic surface comprising
   a vortex generating element reciprocatingly switchable between at least first and second positions, the vortex generating clement being configured to generate vortices in a flow flowing in the area of said flow-dynamic surface, and
   a support member configured to support the vortex generating element, the support member being moveable to selectively hold the vortex generating element in the first position at which the vortex generating element is extended from the surface and in the second position, differing from the first position, at which the vortex generating element is retracted into the surface such that the supporting member is switchable between the first and second positions by the application of an external magnetic force external to the switchable vortex generator, the support member including a bistable biasing member configured to bias the vortex generating element in the first position so that the vortex generating element remains in the first position without energy input.

* * * * *